(12) United States Patent
Tanaka et al.

(10) Patent No.: US 8,532,976 B2
(45) Date of Patent: Sep. 10, 2013

(54) INFORMATION PROCESSING DEVICE FOR MANAGING IDENTIFIERS FOR A PLURALITY OF CONNECTED CONTROLLERS

(75) Inventors: Shinichi Tanaka, Kanagawa (JP); Tadayasu Hakamatani, Tokyo (JP); Masaki Higuchi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 142 days.

(21) Appl. No.: 12/438,853

(22) PCT Filed: Aug. 13, 2007

(86) PCT No.: PCT/JP2007/065812
§ 371 (c)(1),
(2), (4) Date: Apr. 1, 2009

(87) PCT Pub. No.: WO2008/035516
PCT Pub. Date: Mar. 27, 2008

(65) Prior Publication Data
US 2010/0017190 A1 Jan. 21, 2010

(30) Foreign Application Priority Data
Sep. 21, 2006 (JP) ................. 2006-256061

(51) Int. Cl.
*G06F 9/455* (2006.01)
(52) U.S. Cl.
USPC ................. 703/25; 703/24; 463/47
(58) Field of Classification Search
USPC ................. 703/24, 25, 23; 463/47
See application file for complete search history.

(56) References Cited

U.S. PATENT DOCUMENTS

| 4,253,145 A | 2/1981 | Goldberg |
| 4,588,187 A * | 5/1986 | Dell ................. 463/47 |

(Continued)

FOREIGN PATENT DOCUMENTS

| JP | 5012188 A | 1/1993 |
| JP | 7313733 A | 12/1995 |

(Continued)

OTHER PUBLICATIONS

International Search Report for corresponding patent application PCT/JP2007/065812, Sep. 4, 2007.
International Preliminary Report on Patentability for corresponding PCT application PCT/JP2007/065812, Mar. 24, 2009.
Office Action for corresponding application JP2006-256061, dated Nov. 1, 2011.

(Continued)

*Primary Examiner* — Dwin M Craig
(74) *Attorney, Agent, or Firm* — Matthew B. Dernier, Esq.; Gibson & Dernier LLP

(57) ABSTRACT

To provide an emulator capable of targeting a device capable of accepting connection of an expansion device for expanding a controller connection port to a plurality of controller connection ports. The emulator, targeting a device having at least one controller connection port and capable of accepting connection of an expansion device for expanding the controller connection port to a plurality of controller connection ports so as to accept connection of a plurality of controllers, emulates operation of the targeted device. The emulator assigns port identification information to each of controllers connected via wire or radio, the port identification information indicating to which of a controller connection port of the targeted device and the controller connection ports of the expansion device connected to the device the controller is assumed to be connected. The assigned port identification information is provided to a process for receiving an operation carried out on the controller.

8 Claims, 2 Drawing Sheets

(56) References Cited

U.S. PATENT DOCUMENTS

| | | | |
|---|---|---|---|
| 5,558,577 A | | 9/1996 | Kato |
| 5,807,175 A | * | 9/1998 | Davis et al. ............... 463/36 |
| 6,511,378 B1 | * | 1/2003 | Bhatt et al. ............... 463/36 |
| 6,691,150 B1 | * | 2/2004 | Yoshino et al. ........... 709/201 |
| 6,872,139 B2 | | 3/2005 | Sato |
| 6,939,232 B2 | | 9/2005 | Tanaka |
| 6,955,606 B2 | | 10/2005 | Taho |
| 7,264,548 B2 | | 9/2007 | Tanaka |
| 8,369,795 B2 | | 2/2013 | Glaser |
| 2002/0072410 A1 | | 6/2002 | Tanaka |
| 2002/0098889 A1 | | 7/2002 | Sato |
| 2002/0187830 A1 | * | 12/2002 | Stockdale et al. ......... 463/29 |
| 2005/0221896 A1 | * | 10/2005 | Lum et al. ............... 463/42 |
| 2005/0238915 A1 | | 10/2005 | Li |
| 2005/0245316 A1 | | 11/2005 | Tanaka |
| 2006/0154725 A1 | * | 7/2006 | Glaser et al. ............ 463/37 |
| 2006/0195522 A1 | | 8/2006 | Miyazaki |
| 2007/0061126 A1 | * | 3/2007 | Russo et al. ............. 703/24 |
| 2013/0143662 A1 | | 6/2013 | Glaser |

FOREIGN PATENT DOCUMENTS

| | | |
|---|---|---|
| JP | 2001340641 A | 12/2001 |
| JP | 2002140154 A | 5/2002 |
| JP | 2002202843 A | 7/2002 |
| JP | 2006190318 A | 2/2006 |
| JP | 2006192259 A | 7/2006 |
| JP | 4318648 B2 | 8/2009 |
| WO | 2005008966 A1 | 1/2005 |

OTHER PUBLICATIONS

"Feature 3 Forbidden Emulator Corpus Part 2 Lets enjoy Consumer Game Machine Software on Windows Machine" Softbank Publishing Inc., vol. 7, No. 4, pp. 156-163 Apr. 2002 Japan. (See OA for explanation of relevancy).

European Search Report for corresponding EP Application 07792455.3, dated Dec. 5, 2012.

Office Action for corresponding Japanese Patent Application No. 2011-288974, dated on Jun. 7, 2013.

* cited by examiner

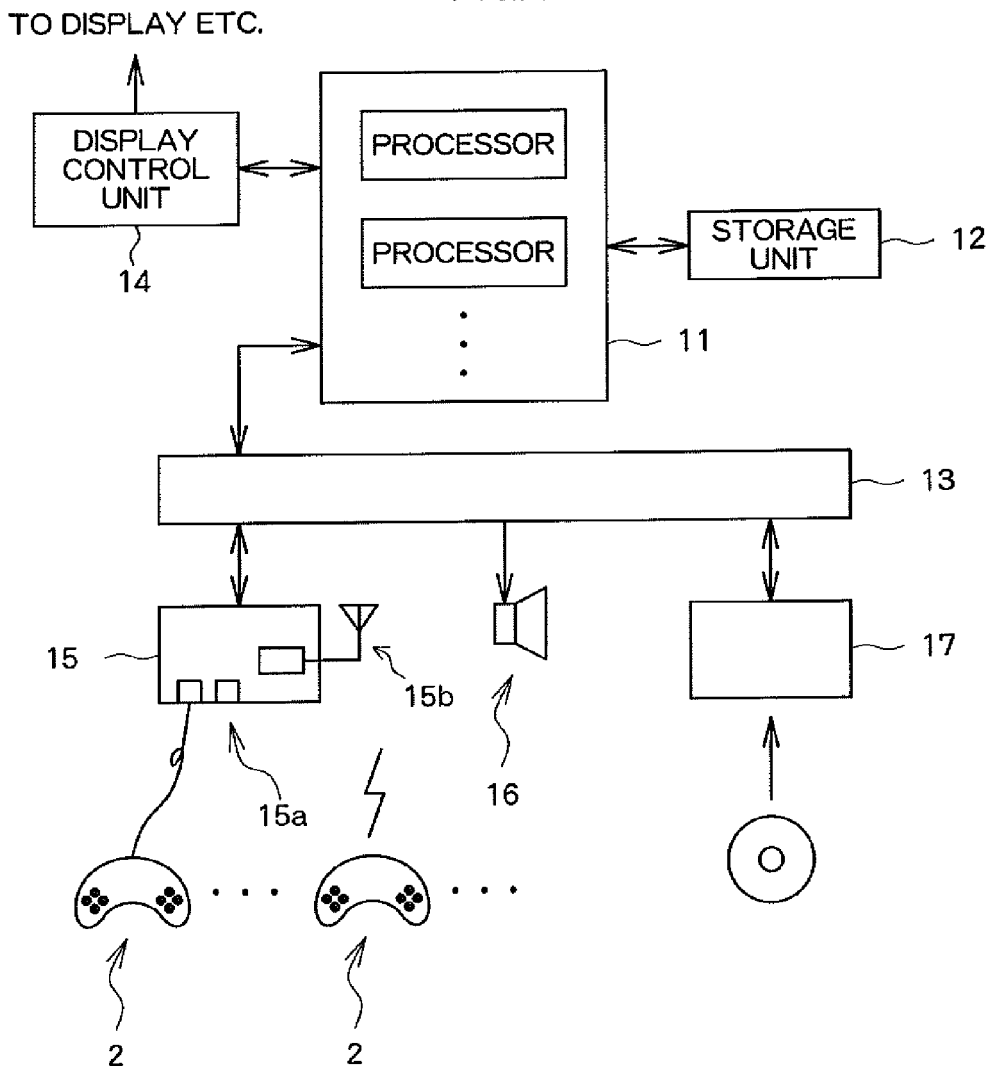
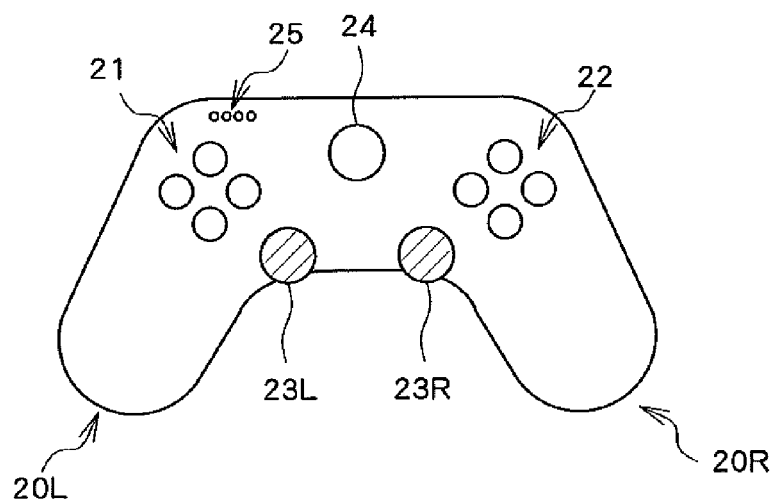

FIG.3
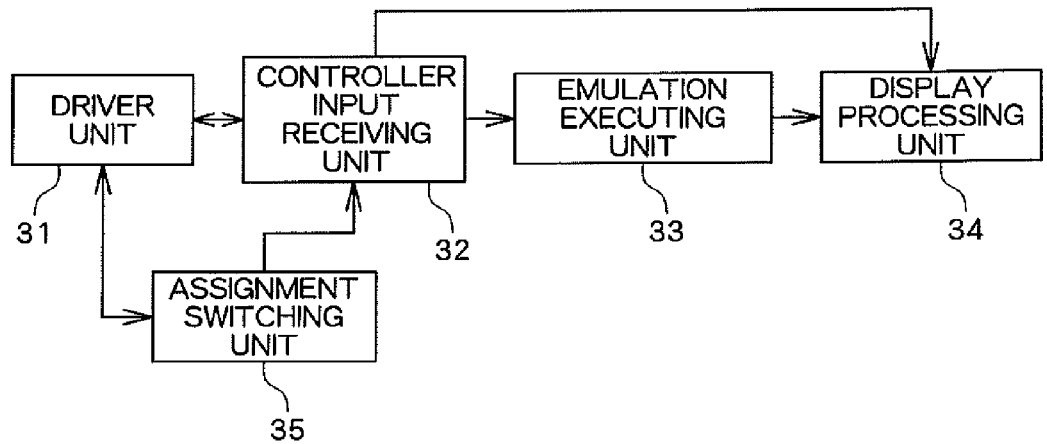
FIG.4
| CONTROLLER IDENTIFIER | 1 | 2 | 3 | ... |
|---|---|---|---|---|
| INTERNAL IDENTIFIER | 1A | 1B | 1C | ... |
FIG.5
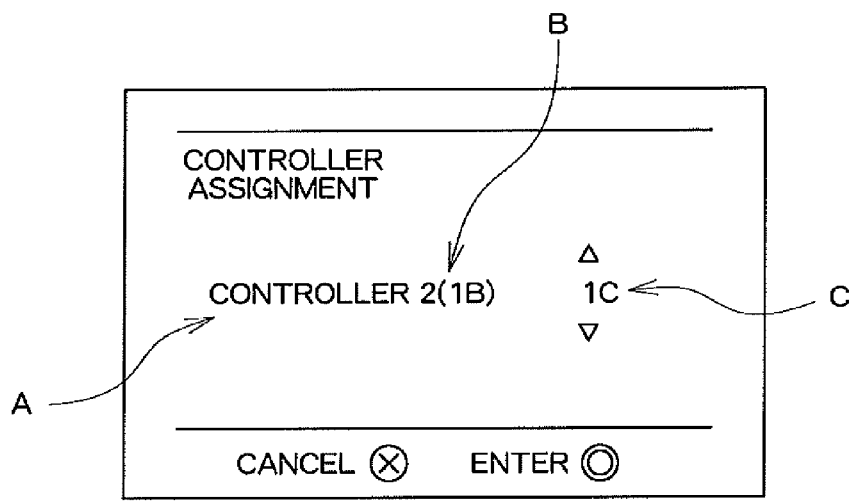

US 8,532,976 B2

INFORMATION PROCESSING DEVICE FOR MANAGING IDENTIFIERS FOR A PLURALITY OF CONNECTED CONTROLLERS

TECHNICAL FIELD

The present invention relates to an emulator for emulating operation of a target information processing device.

BACKGROUND ART

In recent years, with improved performance of computer resources such as processors, a technique (emulation technique) for emulating operation of a conventional information processing device (a target) to make it possible to use a program which can be executed on a conventional information processing device has been widely used. Patent Document 1 discloses an example of such a device utilizing such an emulation technique.

Patent Document 1: Japanese Patent Laid-open Publication No. 2006-190318

It is common for an input device (a controller) of an emulator to be different from that of an information processing device to be emulated.

Some of the information processing devices to be targeted are made adapted to connection of a plurality of controllers via a single connector thereof when, e.g., a branching device for enabling connection of a plurality of controllers is connected to a controller connection connector. For such a device, it may be the case that a program has been developed, which does not accept input of a specific operation unless the specific operation is carried out on a controller connected to a specific terminal of the branching device.

SUMMARY OF THE INVENTION

The present invention has been conceived in view of the above described situation, and one of the objects of the present invention is to provide an emulator capable of targeting a device to which an expansion device, such as a branching device, for expanding a controller connection port to a plurality of controller connection ports can be connected.

In order to address the above described conventional drawback, according to the present invention there is provided an emulator, targeting a device having at least one controller connection port and capable of accepting connection of an expansion device for expanding the controller connection port to a plurality of controller connection ports so as to accept connection of a plurality of controllers, for emulating operation of the targeted device, and for assigning port identification information to each of controllers connected via wire or radio, the port identification information indicating to which of a controller connection port of the targeted device and the controller connection ports of the expansion device connected to the device the controller is assumed to be connected, wherein the assigned port identification information is provided to a process for receiving an operation carried out on the controller.

BRIEF DESCRIPTION OF THE DRAWINGS

FIG. 1 is a structural block diagram of an emulator according to an embodiment of the present invention;

FIG. 2 is an external appearance view showing one example of a controller connected to the emulator according to the embodiment of the present invention;

FIG. 3 is a functional block diagram of the emulator according to the embodiment of the present invention;

FIG. 4 is a diagram explaining an example of an assignment table held in the emulator according to the embodiment of the present invention; and FIG. 5 is a diagram explaining an example of an interface screen image to be displayed on the emulator according to the embodiment of the present invention.

DETAILED DESCRIPTION OF THE INVENTION

An embodiment of the present invention will be described with reference to the accompanying drawings. As shown in FIG. 1, an emulator according to the embodiment of the present invention comprises a control unit 11, a storage unit 12, an interface unit 13, a display control unit 14, a controller interface unit 15, a sound output unit 16, and a disk drive 17, and is connected to at least one controller 2 by wire or radio.

The control unit 11 has at least one processor. The processor of the control unit 11 operates according to a program stored in the storage unit 12 or a disk set in the disk drive 17. In this embodiment, the at least one processor included in the control unit 11 carries out an emulation process for emulating an operation of another information processing device. The emulation process will be described later.

The storage unit 12 comprises a storage element, such as a RAM (Random Access Memory), a ROM (Read Only Memory), and so forth. The storage unit 12 may include a recording medium, such as a hard disk or the like, for magnetically or optically storing information, and a drive. A program to be executed by the processor of the control unit 11 is stored in the storage unit 12. The storage unit 12 also functions as a working memory of the processor.

The interface unit 13 is connected to the control unit 11, controller interface unit 15, sound output unit 16, and disk drive 17. The interface unit 13 outputs an instruction and/or data output from the processor of the control unit 11 to any of the controller interface unit 15, sound output unit 16, or disk drive 17, designated by the processor as a destination of the instruction and/or data. The interface unit 13 also outputs data or the like input from the controller interface unit 15, sound output unit 16, or disk drive 17 to the control unit 11.

The display control unit 14 is connected to the control unit 11, and carries out a rendering process according to an instruction input from the control unit 11. The display control unit 14 also outputs information about an image obtained through the rendering process to a display, a home-use television set, or the like.

The controller interface unit 15 comprises at least one wired port 15a and a radio port 15b. At least one controller 2 is wire connected to the wired port 15a. The wired port 15a outputs information indicating content of an operation carried out on the controller 2 connected thereto, and a uniquely assigned controller identifier of the controller 2, to the processor of the control unit 11. Also, according to an instruction input from the processor of the control unit 11, the wired port 15a sends a controller identifier and information directed to the controller 2 identified by the controller identifier to the controller 2 connected thereto.

The radio port 15b communicates by radio with the controller 2. The radio port 15b outputs information indicating the content of an operation carried out on the controller 2 with which the radio port 15b communicates, and the uniquely assigned controller identifier of the controller 2, on which the operation is carried out, to the processor of the control unit 11. Besides, according to an instruction from the processor of the control unit 11, the radio port 15b sends a controller identifier and information directed to the controller 2 identified by the controller identifier to the controller 2 with which the radio port 15b communicates.

The sound output unit 16 is a sound processor for outputting sound from a sound source having an instructed waveform, and according to an instruction from the processor of the control unit 11, outputs instructed sound. The disk drive 17 reads data from a Blu-ray (registered trademark) disc, a DVD disc, and so forth, and outputs the read data to the processor of the control unit 11.

The controller 2, which is e.g., a game controller here, receives an operation carried out by a user, and sends the content of the operation to the emulator. As shown in FIG. 2, the controller 2 has grips 20R, 20L. A user grips the grips 20 with their right and left hands, respectively. First and second operating units 21, 22 and analogue operating unit 23R, 23L are provided at positions which allow the user gripping the grips 20 to operate these units 21, 22 with their right and left thumbs, respectively. The controller 2 further has a function button 24 and an identifier indication unit 25 both formed thereon, the function button 24 having a predetermined function assigned thereto.

The controller 2 further has a storage unit (not shown). Each controller 2 has a unique controller identifier assigned thereto beforehand. The controller 2 holds the controller identifier in the storage unit. In response to operations carried out with the first and second operating units 21, 22, analog operating units 23R, 23L, and function button 24, the controller 2 sends its own controller identifier, stored in the storage unit, and information indicating the content of the operation, to the emulator connected thereto by wire or radio. The controller 2 also receives information directed to itself (information including its own controller identifier as a destination) from the emulator.

In this embodiment, the emulator assigns a unique internal identifier to each controller identifier to identify the controller 2. Therefore, the controller 2 having once established communication with the emulator sends its own controller identifier to the emulator, upon which an internal identifier assignment (initial assignment) is effected on the emulator side.

On the emulator side, successive numbers may be assigned as a unique internal identifier of the controller 2 in, for example, a predetermined order. The predetermined order may be, for example, the order of controllers 2 which carries out communication with the emulator or on which a predetermined operation (e.g., pressing the function button 24) is carried out. Having assigned the internal identifier, the emulator sends the assigned internal identifier and the relevant controller identifier to the controller 2 corresponding to the assigned internal identifier.

The controller 2, having received the assigned internal identifier, expresses information corresponding to the internal identifier using the identifier indication unit 25. The identifier indication unit 25 may comprise, for example, a plurality of LEDs (light emitting diodes) here. On the controller 2 side, the internal identifier may be expressed by lighting any of the plurality of LEDs and turning off the others.

The function button 24 has a transparent or semi-transparent cover that passes a light beam therethrough and a light emitter, such as an LED or the like, formed under the cover, and according to an instruction from the emulator, may change the light emission state of the light emitter (turned off, blinking, lit, colored light and so forth).

The emulator in this embodiment, targeting, for example, a consumer game device for emulation, reads game software for the target, which is set in the disk drive 17, and carries out a process for the game software.

For example, a consumer game device to be emulated by the emulator in this embodiment has at least one controller connection port. Generally, one controller is connected to each controller connection port of the target.

It is assumed that the target consumer game device is capable of accepting connection, via a controller connection port thereof, of an expansion device (a branching device). The branching device has a terminal for connection to the controller connection port on the target side and a plurality of controller connection ports. This makes it possible to connect a plurality of controllers 2 to a single controller connection port.

That is, connection of the branching device to at least one controller connection port of the target enables connection of a plurality of controllers to the controller connection port via the branching device.

Generally, a target consumer game device identifies a controller connected to each controller connection port thereof, using, as an identifier, a number (1, 2, and so forth) assigned to the controller connection port on the consumer game device side.

However, in the case where a plurality of controllers are connected to a single controller connection port via a branching device, with respect to the controller connected via the branching device, not only the number (1, 2, and so forth) of the controller connection port of the target to which the branching device is connected, but also an identification code (A, B, C, and so forth) of the controller connection ports on the branching device side to which the controller is connected, is used. That is, the target assigns an identifier (port identification information), such as, e.g., "1A", "2A" and so forth, to each controller for identification.

The emulator in this embodiment may target another consumer game device or the like. As it is generally the case that the number of controller connection ports and possibility for connection of a branching device, and the like, may differ among target consumer game devices, a different identifier (port identification code) may be assigned to each target.

Once a target process (a target emulating process) begins, the emulator in this embodiment updates the internal identifier assigned to each controller 2, depending on the controller connection port of the target.

With the internal identifier assigned to each controller 2 changed, as described above, the emulator may send the changed internal identifier to the concerned controller 2. The controller 2, having received notification of the changed internal identifier, updates the indication of the identifier expressed using the identifier indication unit 25.

For example, on the controller 2 to which the internal identifier "1" is assigned in the initial assignment, the identifier indication unit 25 indicates the initial identifier "1" assigned. However, once the assignment is updated, following the target emulation process having begun, and an internal identifier "2" being newly assigned to the controller 2, the identifier indication unit 25 may be changed to indicate the internal identifier "2" assigned.

As shown in FIG. 3, the emulator in this embodiment functionally comprises a driver unit 31 for controlling data transmission and reception with respect to a controller 2 connected thereto by wire or radio, a controller input receiving unit 32, an emulation executing unit 33, a display processing unit 34, and an assignment switching unit 35. These functions are realized through a software process carried out by the processor of the control unit 11 in connection with the controller which is functioning as an input device.

The driver unit 31 receives, from a controller 2 connected thereto by wire or radio, a controller identifier and information indicating the content of an operation carried out on the controller 2, and then outputs the received information to the controller input receiving unit 32.

When the function button 24 is pressed on the controller 2, the driver unit 31 begins a predetermined process. Specifically, here, with the function button 24 pressed, the controller identifier of the controller 2 on which the operation is carried out and a signal indicating that the function button 24 is pressed, are output to the assignment switching unit 35. Thereafter, information indicating the content of an operation carried out on the controller 2 is output to the assignment switching unit 35, not the controller input receiving unit 32, until a return instruction is issued.

When the driver unit 31 receives a controller identifier and information indicating the content of an operation carried out on the controller 2 after a return instruction is issued, the driver unit 31 outputs the received information to the controller input receiving unit 32.

The controller input receiving unit 32 reads an assignment table in which an internal identifier for a target consumer game device is recorded beforehand. The assignment table is a table for correlating a controller identifier to an internal identifier for a respective target, in which a controller identifier to be correlated to each internal identifier is initially left blank (nothing set).

The controller input receiving unit 32 assigns an internal identifier to each controller 2 which is ready for data transmission and reception via the driver unit 31, and then records the controller identifier of the controller 2 so as to be correlated to the assigned internal identifier in the assignment table then stores in the storage unit 12 (FIG. 4).

As the number of controller connection ports, possibility for connection of a branching device, and so forth are generally different among possible target consumer game devices, as described above, a table in which internal identifiers for a respective possible target consumer game device are listed and recorded is stored beforehand in the storage unit 12, as the assignment table. The controller input receiving unit 32 reads an assignment table for a target device for which execution is instructed, then assigns an internal identifier to each controller 2 ready for data transmission and reception via the driver unit 31, and updates the assignment table by correlating the controller identifier of the controller 2 to the assigned initial identifier.

Note that the internal identifier may be similar to the port identifier of a target consumer game device. Once the process begins, internal identifiers may be issued and assigned in a predetermined order, e.g., (assuming that the branching device has four controller connection ports A to D) 1A, 1B, 1C, 1D, 2A . . . , according to the order of controller 2 which carries out communication or on which function buttons 24 are pressed.

Besides, the controller input receiving unit 32 receives the controller identifier and information indicating the content of an operation, having been received by the driver unit 31 from the controller 2, then reads the internal identifier correlated to the controller identifier from the assignment table in the storage unit 12, and outputs the read internal identifier and the received information indicating the content of an operation to the emulation executing unit 33.

Further, the controller input receiving unit 32 receives from the assignment switching unit 35 an instruction to display a screen image related to an assignment switching process, and combines an image related to the instructed screen image display and an image (a game image) output from the emulation executing unit 33, to be described later, in a semi-transparent manner (a combination method for rendering a portion of the instructed image, the portion being related to a significant pixel, over a background game image having lowered brightness, to thereby render an operational image with a background game image in a visible state).

The controller input receiving unit 32 also receives the controller identifier and internal identifier from the assignment switching unit 35, and writes the received internal identifier over the internal identifier already stored in the assignment table so as to be correlated to the received controller identifier. Note that in the above, in the case where there is another controller identifier already recorded in the assignment table so as to be correlated to the received internal identifier, the internal identifier correlated to that controller identifier is overwritten by an unoccupied internal identifier (correlated to nothing). Alternatively, no internal identifier, rather than an unoccupied internal identifier, may be assigned. In this case with no internal identifier to be assigned, control may be made such that information indicating the content of an operation carried out on the controller 2 identified by that controller identifier is not output to the emulation execution unit 33.

The emulation executing unit 33 receives, as an operation of the controller, the internal identifier and information indicating the content of the operation from the controller input receiving unit 32, and also, as an operation of a controller virtually connected to the controller connection port identified by the internal identifier, information indicating the content of the operation, and then carries out a process such as a game and the like.

The display processing unit 34 outputs the rendering instruction input from the emulation executing unit 33 to the display control unit 14, upon which an image and the like is shown on a display device.

The assignment switching unit 35, upon receipt from the driver unit 31 of a controller identifier and a signal indicating that the function button 24 of the controller 2 identified by the controller identifier is pressed, carries out the following process with regard to the controller 2 identified by the received controller identifier as a focused controller.

Initially, the assignment switching unit 35 outputs an instruction to render an interface screen image for "controller assignment", such as is shown in FIG. 5, to the controller input receiving unit 32, upon which the interface screen image is combined with the image related to the rendering instruction output from the emulation executing unit 33 in a semi-transparent manner. In the interface screen image, the currently correlated internal identifier (B), obtained from the controller input receiving unit 32, is shown in addition to the information (A) identifying the focused controller 2.

The assignment switching unit 35 selectively receives the information input together with the controller identifier of the focused controller 2 among the information items indicating operations carried out on the respective controllers 2, input from the driver unit 31.

When an operation for selecting, e.g., the up-down direction is carried out on the focused controller 2, the assignment switching unit 35 receives the operation, and according to the operation, changes the internal identifier (C) in the interface screen image shown in FIG. 5, to which the focused controller 2 is to be correlated. Then, when a button operation "enter" is carried out on the focused controller 2, the assignment switching unit 35 instructs the controller input receiving unit 32 to store the internal identifier selected at the time when the "enter" button operation is carried out so as to be correlated to the controller identifier of the focused controller 2. Also, the assignment switching unit 35 instructs the driver unit 31 to return.

It should be noted that for a controller identifier and information indicating an operation input from any controller 2 other than the focused controller 2 during this period, the assignment switching unit 35 may output that identifier and information intact to the controller input receiving unit 32. In this case, a player using another controller 2 can continue playing the game, with the game screen image formed through semitransparent combination.

It should be noted that although it is described in the above that the interface screen image for changing the internal identifier assignment to the controller 2 is indirectly output via the controller input receiving unit 32, which is related to execution of emulation, to the display processing unit 34, rather than from the assignment switching unit 35, this embodiment is not limited to the above, and the assignment switching unit 35 may directly output an interface screen image rendering instruction to the display processing unit 34, upon which the interface screen image may be combined in a semi-transparent manner with an image related to the rendering instruction output from the emulation processing unit 33.

Alternatively, instead of using the assignment switching unit 35, a menu display function may be executed to display a predetermined menu screen image in the image related to the rendering instruction output from the emulation executing unit 33. Information identifying the focused controller 2 maybe shown in the menu screen image. As a specific example, a menu item for beginning a process as the assignment switching unit 35 may be shown in the menu screen image, as well as a menu item for ending a game process and so forth, so that upon selection, on the focused controller 2, of the menu item for beginning the process as the assignment switching unit 35, the function of the assignment switching unit 35 may be carried out.

In this embodiment, when a game is carried out on a target consumer game device, the emulator assigns information (an internal identifier) identifiable in the target consumer game device to the respective controllers 2 in a predetermined order.

As described above, the predetermined order may be, e.g., the order of controllers 2 which carry out communication with the emulator or on which a predetermined operation (e.g., pressing the function button 24) is carried out.

When one of the players presses the function button 24 of their controller 2 when playing a game for a target consumer game device, an assignment switching interface is superimposed on the game screen image. In the above, information identifying the controller 2 on which the function button 24 is pressed is shown, so that the players can know who is changing the internal identifier.

When the internal identifier changing operation is completed by a player, the controller 2 used by the player will be thereafter recognized on the game software side as a controller identified by the changed internal identifier.

With the above, even when, for example, a program which does not accept input of a specific operation unless the specific operation is carried out on a controller connected to a specific terminal of a branching device is executed, the player can disguise the operation carried out on the controller 2 as an operation carried out on a controller connected to the specific terminal.

With the above, in this embodiment, it is possible to target a device adapted to connection of an expansion device, such as a branching device, for expanding a controller connection port to a plurality of controller connection ports.

It should be noted that for the function button 24 comprising a light emitting device capable of changing the light emission mode according to an instruction from the emulator, upon receipt of a notification from the driver unit 31, telling that switching of internal identifier assignment is requested (by, for example, pressing the function button 24 and the like), the assignment switching unit 35 may instruct to report acceptance of the assignment switching request to the focused controller 2 on which that operation is carried out.

In this case, according to the instruction, the driver unit 31 issues an instruction to make the light emission mode of the function button 24 be different (e.g., blinking, changing color, and so forth) from that of the function button 24 of another controller 2, together with the controller identifier of the focused controller 2. Alternatively, an instruction to make the light emission manner of the function button 24 of a controller 2 other than the focused controller 2 be different (unlit, and so forth) from that of the focused controller 2 may be issued.

The above described arrangement makes it possible for the player using the controller 2 serving as a focused controller 2 to readily know of acceptance of their request to change the internal identifier assignment.

Further, in response to an instruction to execute a program on the target device, the emulator in this embodiment may determine whether or not the program to be executed is adapted to a branching device, and when the program is not adapted to a branching device, may change the internal identifier in the assignment table. For this case, for a target which is adapted to connection of a branching device, an assignment table for use with a branching device connected (an assignment table in which an internal identifier corresponding to a branching device is set) and an assignment table for use with no branching device connected (an assignment table in which an internal identifier corresponding to a case in which a branching device is not included is set) may be held beforehand as assignment tables for the target, so that either assignment table may be selectively read and used depending on the program to be executed.

As a specific example, a list of programs adapted to a branching device may be held beforehand in the storage unit 12, and whether or not the program to be executed is adapted to a branching device may be determined based on whether or not the program is included in the list.

It should be noted that although it is described in the above that the order for assigning internal identifiers to the respective controllers 2 is determined beforehand, the assignment order may be stored as a preset in the storage unit 12 for each of at least some programs to be executed on a target device, so that when executing a program having a preset set, the internal identifiers may be assigned to the respective controllers 2 in the order designated by the preset.

Alternatively, instead of assigning a preset to each program, a plurality of tables for correlating a controller identifier to an internal identifier may be set as preset candidates in the storage unit 12, so that upon selection of one of the preset candidates, the assignment table may be overwritten by the selected table.

When the assignment table is changed through an operation by a player, an instruction to hold that assignment table may also be received from the player, and the assignment table held as a registration table in the storage unit 12. The registration table held in the storage unit 12 may be used as a default assignment table or retrieved through an operation by a player for use as an assignment table.

In the above, considering the possibility that the number of controllers 2 connected at the time when a save instruction is issued differs from that at the time when the registration table is retrieved, information indicating the number of controllers 2 connected at the time when the save instruction is issued may be held as a use condition so as to be correlated to the registration table.

Then, when using the registration table as a default assignment table, the number of controllers 2 connected at the time of retrieving the registration table is counted, and whether or not the counting result coincides with the number of controllers 2 included in the use condition held correlated to the registration table is determined. When the counted number coincides with the number included in the use condition, that registration table is written over the assignment table and used.

Likewise, when the registration table is retrieved through an operation by a player, the number of controllers 2 connected at the time of retrieving the registration table is counted, and whether or not the counting result coincides with the number of controllers 2 included in the use condition held correlated to the registration table is determined. When the counted number coincides with the number included in the use condition, that registration table may be written over the assignment table and used.

The registration table may be stored for each program. That is, in response to a save operation, an assignment table may be stored as a registration table in the storage unit 12 so as to be correlated to information (e.g., a program name, an identification code assigned to each program, and so forth) specifying the program being carried out at the time. In the above, when beginning execution of a program for a device to be a target subsequently, the emulator determines whether or not a registration table correlated to information specifying that program is held in the storage unit 12, and with the registration table held, the emulator retrieves the registration table, then writes the retrieved table over the assignment table, and uses this new table.

Also in this case, if use condition information, such as the number of controllers 2 connected at the time when a save instruction is issued, is held correlated to the registration table, as well as the information specifying the program, whether or not the use condition is satisfied (e.g., the number of controllers 2 connected at the time of retrieving the registration table is counted and whether or not the counted number coincides with the number of controllers 2 included in the use condition held correlated to the registration table is determined) is determined when retrieving the registration table, and with the use condition satisfied, the registration table may be written over the assignment table and used as an assignment table.

Note that the use condition for the registration table is not limited to the number of controllers 2, as described above, but the type of the controller 2, the number of controllers 2 of each type, a function of the controller 2, the number of players, and other information may be usable. Having an assignment table set by a player available for subsequent use, as described above, can improve convenience, and additional recording of a condition at the time when an assignment table is set enables to respond to a change of use condition in subsequent use.

In the case where there is any controller identifier having no internal identifier assigned thereto (an unassigned controller) in the assignment table, a list of controller identifiers of unassigned controllers may be additionally shown in the assignment switching interface.

In the case where there is a controller 2, during the assignment switching operation, already recorded in the assignment table at that time, so as to be correlated to the internal identifier selected through an operation carried out on the focused controller 2, the emulator in this embodiment may instruct that the function button 24 of that controller 2 emits light in a predetermined manner (e.g., blinking red light, and so forth). This makes it possible to alert a player using the controller 2 to the possibility that the assignment maybe changed even when the player does not intend assignment change.

The invention claimed is:

1. An information processing device including at least one computer processor operating to implement functional units, comprising:

an assigning unit for assigning a unique internal identifier to each of a plurality of connection controllers connected to the information processing device via wire or wireless connection, the respective internal identifiers being used for identifying each of the connection controllers;

an internal identifier displaying unit for displaying the respective internal identifiers assigned to each of the connection controllers;

a change accepting unit for: (i) selectively defining, as a focused controller, one of the connection controllers on which a predetermined request operation is carried out, (ii) accepting an assignment change instruction to change the internal identifier of the focused controller initiated by a user of the focus controller, and (iii) informing the connection controller defined as the focused controller of being selected as the focused controller by issuing a command to the focus controller to change a light emission mode of a light emitting device located on the focus controller to indicate the selection; and an assignment changing unit for: (i) determining whether or not one of the internal identifiers assigned to another of the connection controllers is the same as the internal identifier of the assignment change instruction for changing the internal identifier of the focused controller; and (ii) if the determination is negative, then changing the internal identifier assigned to the focused controller to an accepted internal identifier according to the accepted assignment change instruction.

2. The information processing device according to claim 1, wherein the respective internal identifiers assigned to each of the connection controllers is provided to a process for receiving operations carried out on the connection controllers.

3. The information processing device according to claim 1, wherein, when the assignment changing unit writes the accepted internal identifier over the internal identifier of the focused controller, in a case where there is already another of the connection controllers already having been assigned the accepted internal identifier, the assignment changing unit writes a new internal identifier, which has not been assigned to any of the connection controllers, over the internal identifier of the other of the connection controllers.

4. The information processing device according to claim 1, wherein, when the assignment changing unit writes the accepted internal identifier over the internal identifier of the focused controller, in a case where there is already another of the connection controllers already having been assigned the accepted internal identifier, the assignment changing unit does not assign a new internal identifier to the other of the connection controllers.

5. The information processing device according to claim 1, wherein, in a case where one of the connection controllers to which the accepted internal identifier has already been assigned, the change accepting unit alerts the one connection controller that the assignment may be changed.

6. The information processing device according to claim 1, wherein the change accepting unit selectively receives from the focused controller an operation instructing the assignment change of the internal identifier of the focused controller to the accepted internal identifier.

7. The information processing device according to claim 1, wherein:

the information processing device is an emulator that emulates, targeting a target device which has at least one controller connection port and to which the expansion device for expanding the controller connection port to a plurality of controller connection ports can be connected, an operation of the target device, and the assigning unit assigns to each of the connection controllers, as the unique internal identifier, port identification information indicating that the connection controller is assumed to be connected to one of the controller connection port of the targeted device and the controller connection port of the expansion device connected to the targeted device.

8. The information processing device according to claim 7, wherein the port identification information indicating that the connection controller is assumed to be connected to the controller connection port of the expansion device connected to the target device includes information for identifying the controller connection port of the targeted device to which the expansion device is connected and information for identifying one of the plurality of controller connection ports of the expansion device.

* * * * *